(12) United States Patent
Ogawa (10) Patent No.: US 6,424,612 B1
(45) Date of Patent: Jul. 23, 2002

(54) REPRODUCING METHOD AND APPARATUS FOR OPTICAL DISK

(75) Inventor: Masatsugu Ogawa, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/427,285

(22) Filed: Oct. 26, 1999

(30) Foreign Application Priority Data

Oct. 27, 1998 (JP) .......................................... 10-305377

(51) Int. Cl.[7] ................................................. G11B 7/00
(52) U.S. Cl. ................................................. 369/124.12
(58) Field of Search ........................ 369/44.32, 44.35, 369/44.41, 124.12, 47.15, 47.25, 124.1, 124.11

(56) References Cited

FOREIGN PATENT DOCUMENTS

| JP | 60-113333 | 6/1985 |
|---|---|---|
| JP | 1-107328 | 4/1989 |
| JP | 4-60927 | 2/1992 |
| JP | 5-101414 | 4/1993 |
| JP | 8-63761 | 3/1996 |
| JP | 9-91717 | 4/1997 |
| JP | 9-282669 | 10/1997 |
| JP | 10-11762 | 1/1998 |
| JP | 10-106123 | 4/1998 |

*Primary Examiner*—Paul W. Huber
(74) *Attorney, Agent, or Firm*—Hayes Soloway P.C.

(57) ABSTRACT

A method and an apparatus correctly detect a reproducing signal of an optical disk with a high margin. An optical spot is emitted to an optical disk, and information recorded on the optical disk is reproduced based on the optical output by detecting a light transmitted or reflected by the optical disk. Information can be reproduced by a sum signal obtained by adding up optical outputs from the first set of two optical detectors A and B positioned opposite each other in the proceeding direction of the optical spot on the optical disk.

10 Claims, 11 Drawing Sheets

A1, A2 ~ D1, D2 : Optical detector

REPRODUCING METHOD AND APPARATUS FOR OPTICAL DISK

BACKGROUND OF THE INVENTION

1. Field of the Invention

The present invention relates to a technology for reproducing information recorded on an optical disk, and more specifically to an apparatus and a method for reproducing information recorded on an optical disk for high-density recording.

2. Description of the Prior Art

Figure 9:
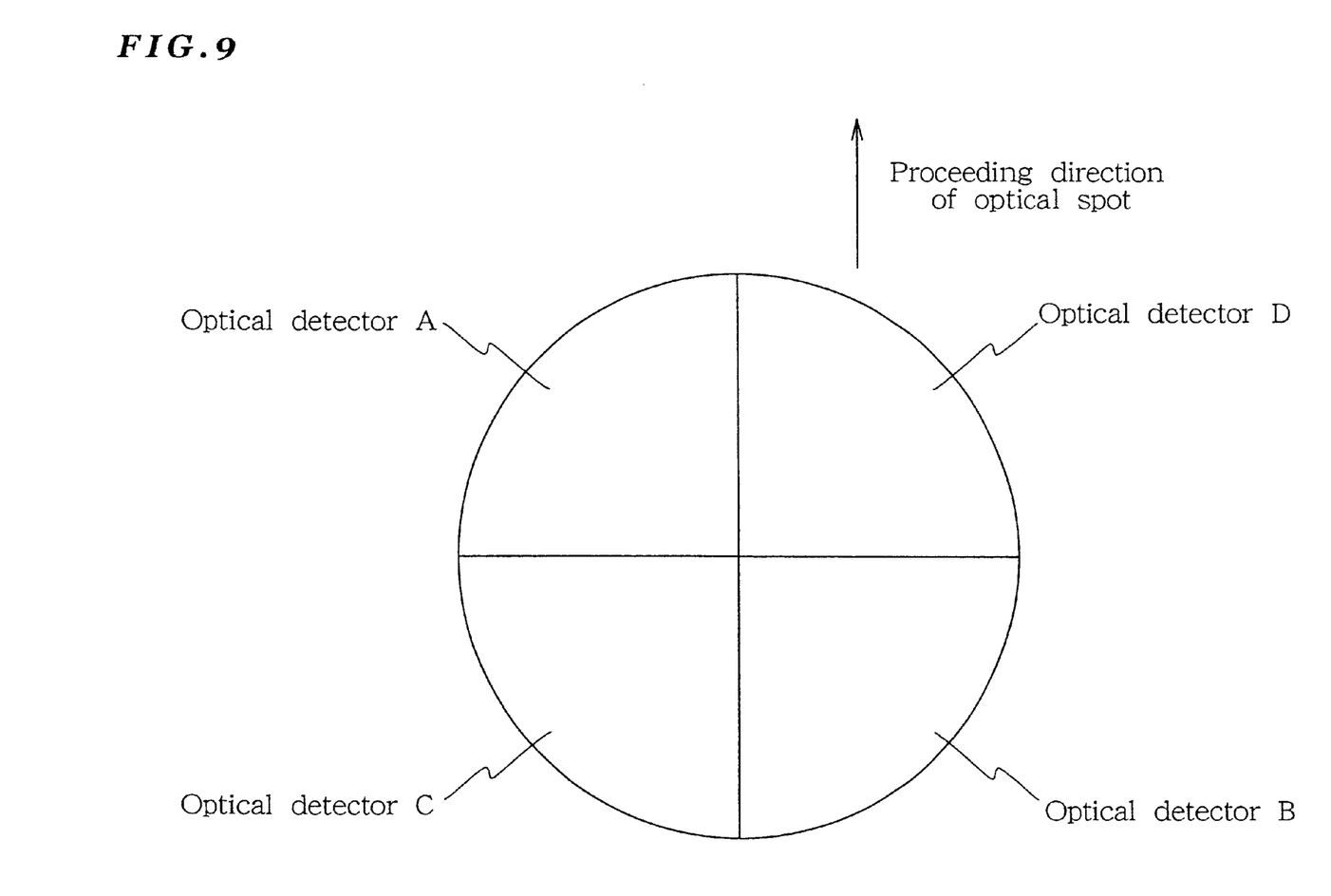
FIG. 9 is a view showing the arrangement of the optical detector used in the conventional reproducing technology.

There are three types of optical disks commonly used at present. They are: (1) reproducable-only optical disks; (2) once-writable optical disks; and (3) freely writable optical disks. The reproducable-only optical disks can be CD, CD-ROM, DVD-ROM, DVD-Video, etc. The once-writable optical disks can be CD-R, DVD-R, etc. The freely writable optical disks can be MO, PD, DVD-RAM, etc. Among the above described optical disks, reproducable-only optical disks are made of a substrate of polycarbonate, etc. in which holes called 'pits' are made to provide information to be recorded. A high-reflective film of Al, AlTi, etc. is coated on the substrate. When recorded information is reproduced, a laser beam, etc. is emitted and forms an optical spot on the above described pits. By detecting the laser beam reflected on the optical spot, the optical spot causes optical interference at a point where a pit exists, thereby reducing the amount of the reflected light. Since the intensity of a light depends on the existence and non-existence of a pit and detected as a signal, it can be retrieved as information. An optical detector for detecting a reflected light from an optical disk is disclosed by Japanese Patent Laid-Open No. 5-101414. According to this technology as shown in FIG. 9, the optical disk is equally divided into four sections A, B, C and D by an axis in the proceeding direction (along the circumference of an optical disk) of an optical spot on the optical disk, and by an axis vertical to the axis in the proceeding direction. A sum (A+B+C+D) of the outputs of the quarters A, B, C, and D of the optical detector forms a reproducing signal. This signal is referred to as a sum signal in this specification. A track servo signal for use in leading the optical spot along the above described pit when the information recorded on the optical disk is reproduced can be a signal obtained by (A+B)−(C+D) or (C+D) (A+B) in, for example, DVD-ROM, DVD-Video, etc.

A once-writable disk is made of a substrate of polycarbonate on which an organic chromogenic film, etc. is coated. When information is recorded, a high-level output optical beam is emitted to a point at which the information is recorded, and a hole is made in the organic chromogenic film as a predetermined mark, thereby generating an object corresponding to a pit of the read-only optical disk. Otherwise, information can be reproduced as in the reproducable-only optical disk. The pit and the corresponding mark can be data division signal. In the once-writable optical disk, the optical detector shown in FIG. 9 is used, and a reproducing signal is formed by a sum of the outputs from the quarters A through D of the optical detector (sum signal). On the other hand, as a track servo signal, a difference signal obtained by the difference between the right and left halves of the optical disk in the proceeding direction of the optical spot is used such as (A+C)−(B +D) or (B+D)−(A+C). On the once-writable optical disk, a pit similar to that of the reproducable-only optical disk exists on the substrate. The pit portion is referred to as an ID division. The ID division can be read by a sum signal when information is reproduced, or can also be read by a difference signal.

Furthermore, a freely writable optical disk is made of a substrate of polycarbonate coated with plural layers of thin films containing a recording film. The recording film is a magnetic substance such as TbTeCo, etc. in an MO (magneto-optic disk), and is made of chalcogenide phase change material such as GeSbTe in a PD and DVD-RAM.

An MO detects a signal by a method of detecting a change in the deflection direction of an incident light, and is basically different from the above described method of detecting a signal according to the above described sum and difference signals. When information is recorded on an optical disk, a high-level output optical beam is emitted to a point at which the information is to be recorded, and a predetermined mark is formed by reversing the magnetization of the magnetic substance. The information is recorded on the recording film as a data division signal. However, in an MO, there is also a pit referred to as an ID division on the substrate, and the signal is read by a sum signal.

On the other hand, an optical disk made of a phase change material, for example, PD, DVD-RAM, etc. detects a signal by detecting the difference in intensity of optical reflection between a crystal division and an amorphous division. That is, the detection is carried out by using a sum signal. When information is recorded, a high-level output optical beam is emitted to a point at which the information is to be recorded, the phase change film is set amorphous, and a mark is formed. The information recorded on the recording film is referred to as a data division signal.

A pit referred to as an ID division exists on a substrate of an optical disk made of the above described phase change material. In a PD, an ID signal (ID information) is detected by using a sum signal. In DVD-RAM, an ID signal (ID information) is detected by using a difference signal. In the above described optical disks, a difference signal obtained by (A+C)−(B+D) or (B+D)−(A+C), etc. is used as a track servo signal.

Figure 10:
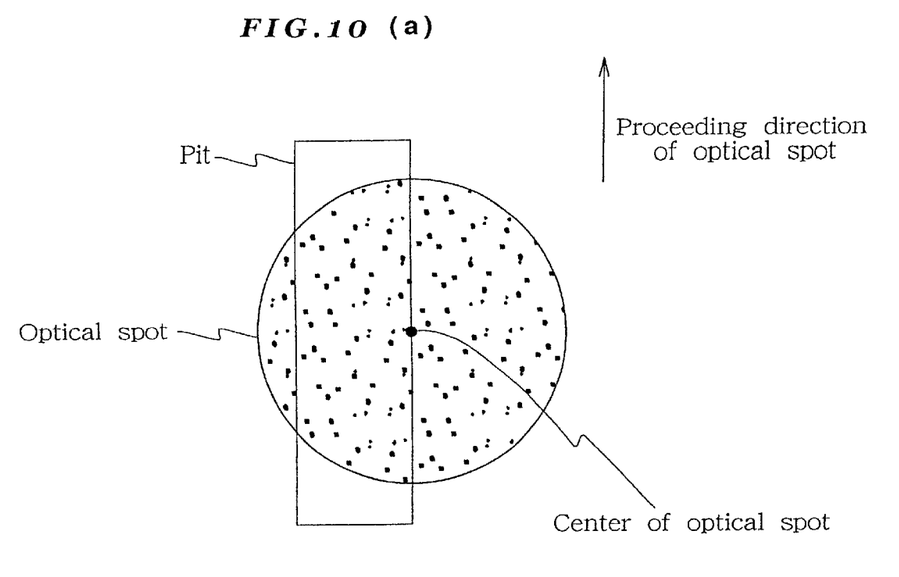
FIGS. 10(a) and 10(b) are views showing the positional relationship between a mark or a pit and an optical spot according to the present invention.

As described above, a signal relating to information recorded on an optical disk can be often detected by using a sum signal or a difference signal in an optical disk. Generally, in case of the difference signal reproducing system, an optical spot does not pass through the central part of a pit or a recording signal as shown in FIG. 10(*a*), but passes through the edge part of the pit or the recording signal. On the other hand, in case of the sum signal reproducing system, an optical spot often passes through the central part of a pit or a recording signal as shown in FIG. 10(*b*). However, even in case of reproducing a sum signal, information can also be reproduced in principle in the form as shown in FIG. 10(*a*).

BRIEF SUMMARY OF THE INVENTION

The merit of the sum signal reproducing system is to obtain a stable read signal output without a large difference in a reproducing signal even when the optical axis of an optical spot cannot be vertical to the recording surface of an optical disk because, for example, the optical disk becomes tilted.

Figure 11:
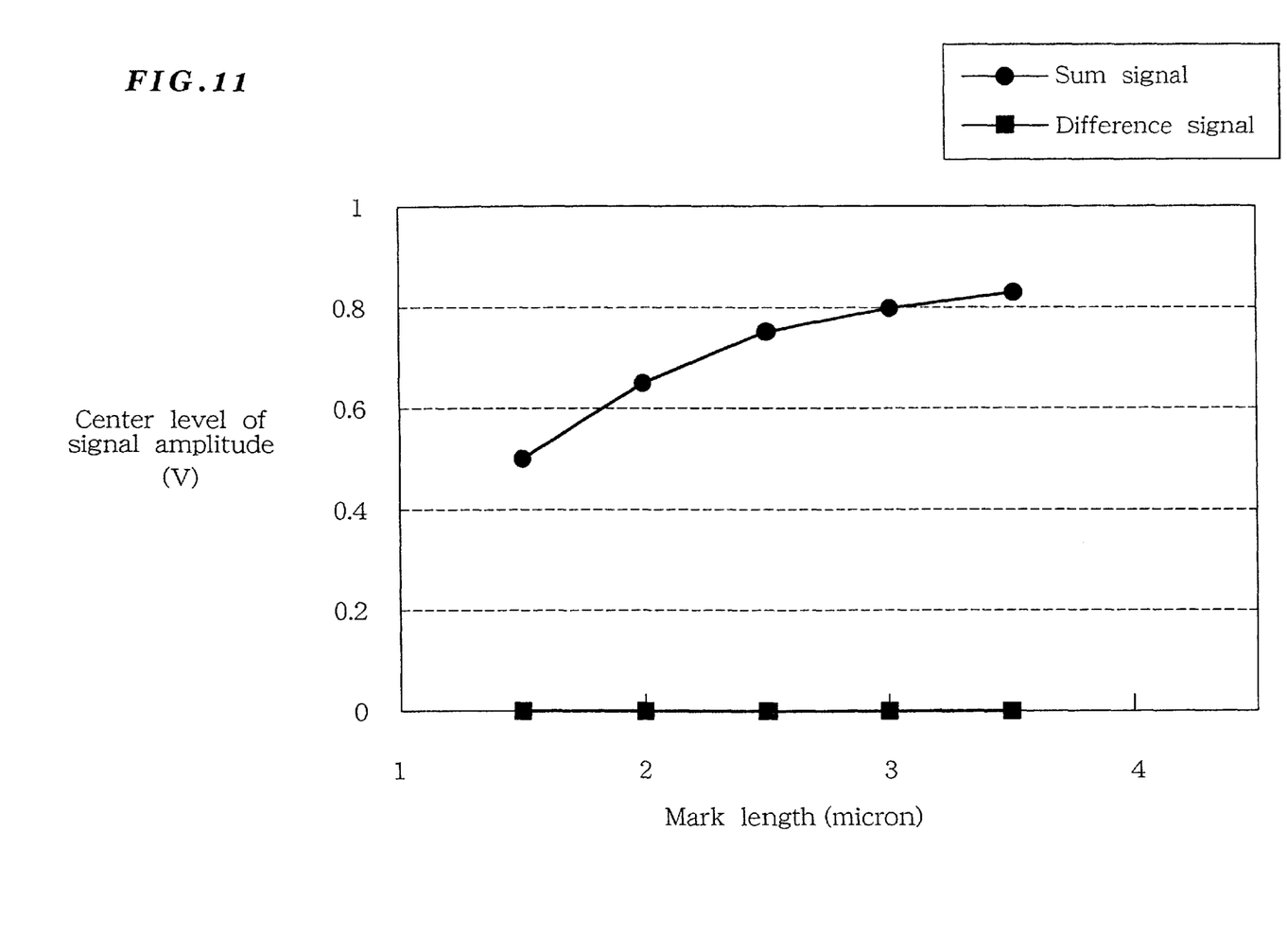
FIG. 11 is a view showing the relationship between the center value of the signal amplitude and the length of a mark or a pit according to the conventional reproducing technology.

However, since both diffracted light in the proceeding direction of an optical spot and diffracted light vertical to the proceeding direction of the optical spot are detected, a reproducing signal reflects the characteristics of both diffracted lights. As a result, as shown in FIG. 11, there arises the problem that the center position (center level) of signal amplitude is shifted (fluctuates) depending on the length of the mark and the pit in the proceeding direction of the optical spot.

Thus, shifting the center position of signal amplitude depending on the length of a mark or a pit means that there arise a mark or a pit having a correctly detected length and a mark or a pit having an incorrectly detected length depending on how a slice level is determined after slicing a detection signal at a certain level (threshold) to generate a binary signal indicating 0 or 1. As a result, the jitter (fluctuation of the edge of a signal) rises, thereby increasing miss-detection of data. This phenomenon conspicuously appears when a pit formed on a substrate is detected.

On the other hand, in the difference signal system, the difference between the output on the right and the output on the left in the proceeding direction of an optical spot is computed. Therefore, the left and right diffracted lights in the direction vertical to the proceeding direction of the optical spot are offset by each other. As a result, only the effect of the diffracted light in the proceeding direction of the optical spot works. Accordingly, a detected signal is subject to only the effect of a diffracted light in one direction, thereby indicating a simple characteristic. Therefore, as shown in FIG. 11, the center positions of the signal amplitude of all lengths of marks and pits match. Therefore, the slice level of a detection signal when it is binarized is uniquely determined, thereby correctly detecting the edges of all lengths of marks or pits.

However, a difference signal is different from a sum signal as follows. That is, when an optical disk is tilted, especially when it is tilted to right or left about the surface vertical to the proceeding direction of the optical spot, the left-right balance of the reflected light of the optical spot cannot be maintained. Therefore, the offset between the left and right diffracted lights becomes incomplete, thereby causing a large change in a reproducing signal and the problem that a stable output can hardly be obtained.

SUMMARY OF THE INVENTION

The present invention aims at providing a method and an apparatus for reproducing information stored on an optical disk by effectively detecting a reproducing signal with a high margin.

The feature of the method of reproducing information on an optical disk according to the present invention resides in reproducing information recorded on an optical disk according to a signal obtained by adding up optical outputs from two optical detectors positioned opposite each other in the proceeding direction of an optical spot emitted to the optical disk. In this case, the optical outputs of two other optical detectors positioned opposite each other in the direction vertical to the proceeding direction of the optical spot are added up. The sum is multiplied by a coefficient larger than 0 and smaller than 1. Then, the resultant output is added to the above described sum signal to preferably reproduce information. Furthermore, the above described two optical detectors are divided into two sections in the direction vertical to the proceeding direction of the optical spot, and the other two optical detectors are divided into two sections in the proceeding direction of the optical spot so that the information can be reproduced by track-controlling the optical spot relating to the optical disk using each optical output from each of the divided optical detectors.

In addition, the optical disk reproducing apparatus according to the present invention includes a unit for emitting an optical spot to an optical disk, an optical detector for detecting a light transmitted through or reflected by the optical disk, and an operations unit for computing an output from the optical detector to obtain an information reproducing signal. With the configuration, the optical detector includes the first and the second optical detectors positioned opposite each other in the proceeding direction of the optical spot on the optical disk. The operations unit includes a unit for obtaining the first sum signal obtained by adding up the optical outputs from the first and the second optical detectors. Furthermore, according to the present invention, the optical detector includes the third and the fourth optical detectors positioned opposite each other in the direction vertical to the proceeding direction of the optical spot. The operations unit includes: a unit for obtaining the second sum signal obtained by adding up the optical outputs from the third and the fourth optical detectors; and a unit for multiplying the second sum signal by a coefficient larger than 0 and smaller than 1 and adding the obtained product to the first sum signal. Furthermore, it is desired that the first and the second optical detectors are divided into two portions in the direction vertical to the proceeding direction of the optical spot, and that the third and the fourth optical detectors are divided into two portions in the direction vertical to the proceeding direction of the optical spot.

According to the present invention, the above described two former optical detectors receive diffracted lights in the proceeding direction of the optical spot, and the above described two latter optical detectors receive diffracted lights in the direction vertical to the proceeding direction of the optical spot. A diffracted light in the direction vertical to the proceeding direction of the optical spot depends on the width of a mark or a pit, and a diffracted light in the proceeding direction of the optical spot depends on the length of a mark or a pit. However, with the above described configuration, a diffracted light in the proceeding direction of the optical spot can be mainly detected by using as a reproducing signal a sum obtained by multiplying a sum of the optical outputs from the former two optical detectors or a sum of the optical outputs from the later two optical detectors by a coefficient a ($0<\alpha<1$). In case of a sum signal, the diffracted light contains the characteristics about the edge of a mark or a pit. Therefore, there arises no problems that the center position of signal amplitude may be shifted depending on the length of the mark or the pit in the proceeding direction of the optical spot. As a result, a high margin specific to a sum signal can be obtained without the problem that the center position of signal amplitude may be shifted depending on the length of a mark or a pit in the proceeding direction of the optical spot.

BRIEF DESCRIPTION OF THE DRAWINGS

FIGS. 6(*a*) and 6(*b*) are views showing the arrangement of the optical detector according to the embodiment of the present invention;

DETAILED DESCRIPTION OF THE PREFERRED EMBODIMENTS

Figure 1:
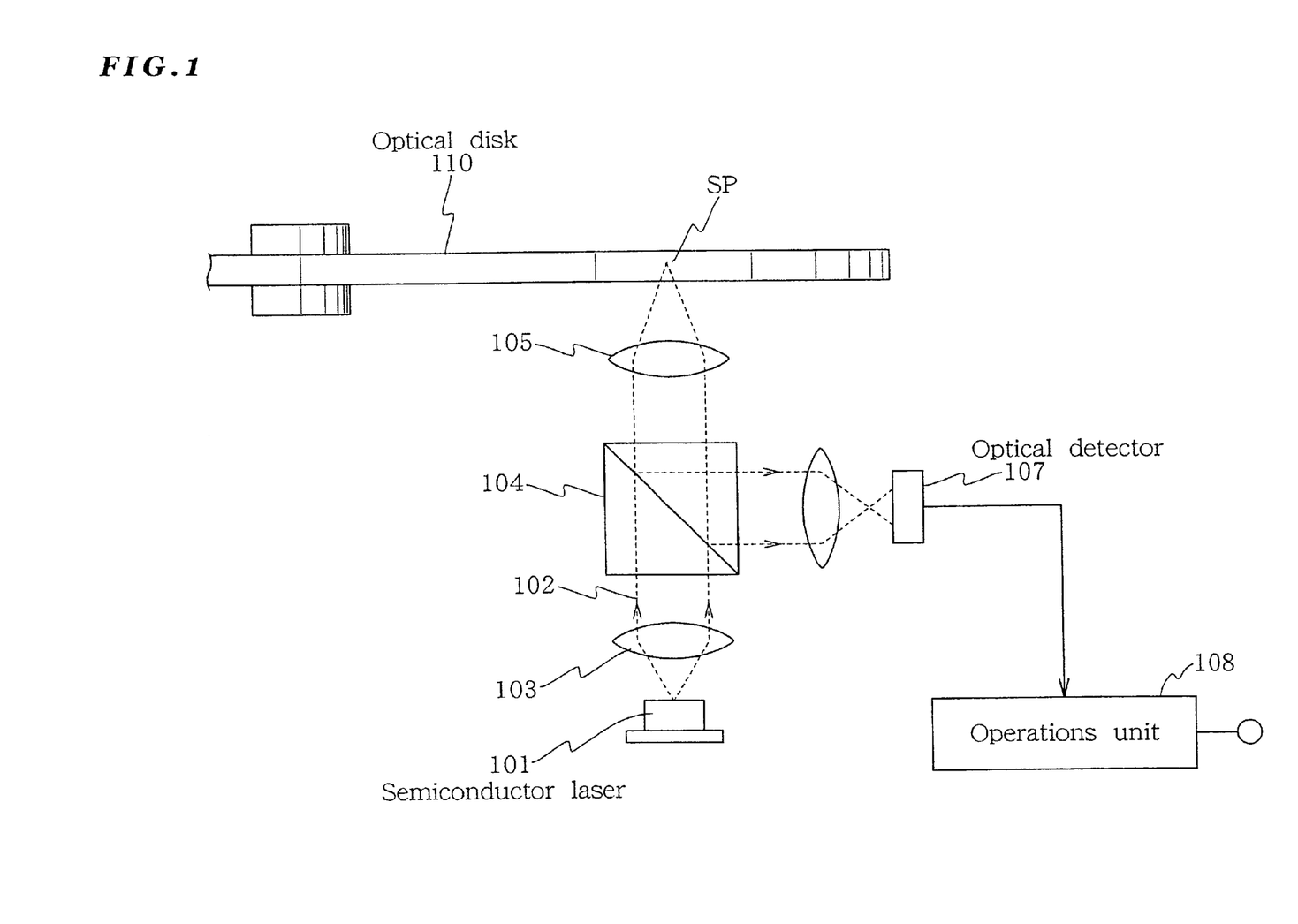
FIG. 1 is a view showing the outline of the configuration of the optical disk reproducing apparatus according to the present invention.

An embodiment of the present invention will be described below by referring to the attached drawings. FIG. 1 shows the outline of the configuration of the optical disk reproducing apparatus according to the present invention. Laser beams 102 emitted from a semiconductor laser 101 as a light source unit are set as a parallel luminous flux by a collimated lens 103. The laser beams 102 as a parallel luminous flux are transmitted through a beam splitter 104, and then converged by an objective lens 105. The converged beams are emitted to the recording surface of an optical disk 110 as an optical spot SP.

Figure 2:
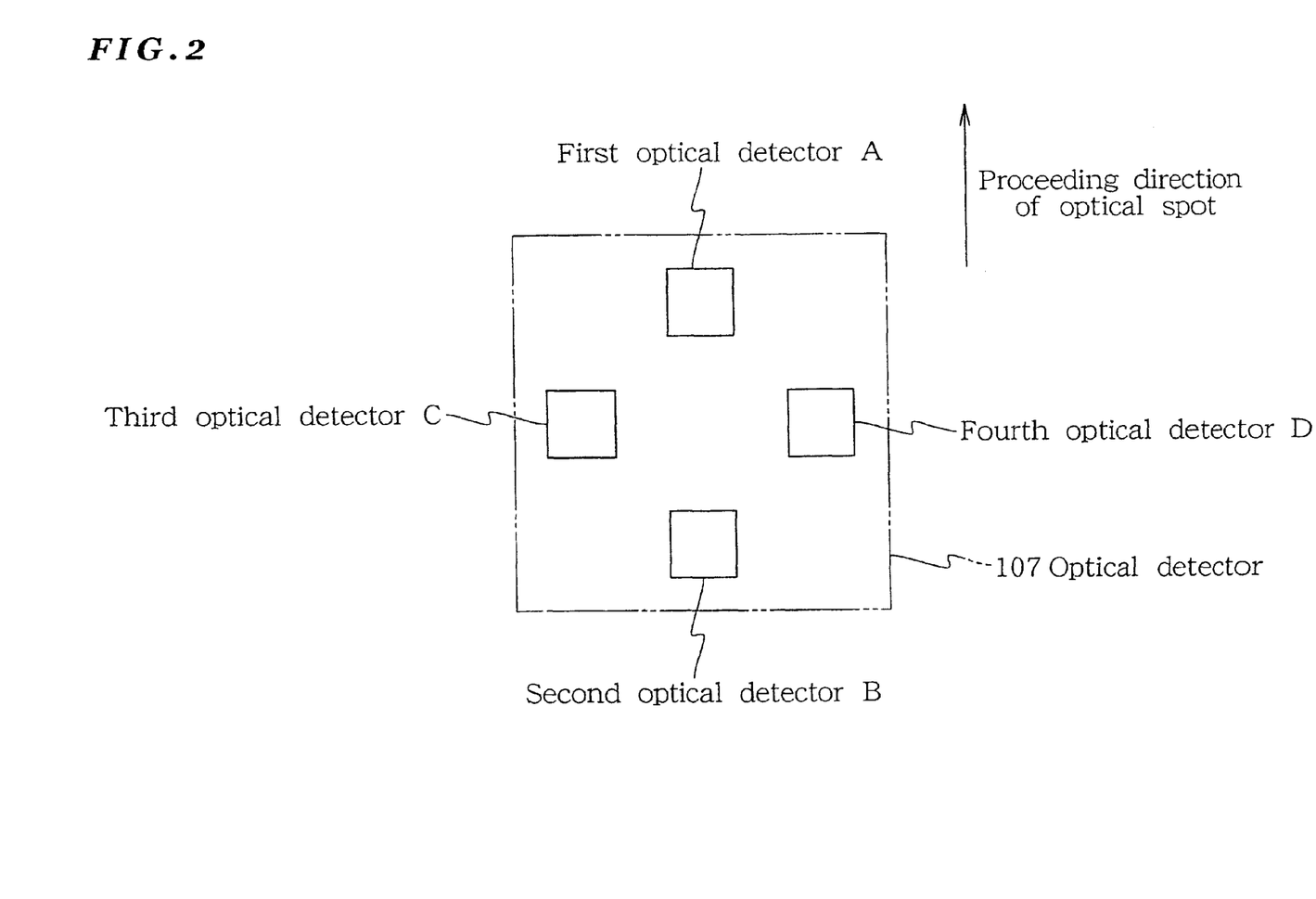
FIG. 2 is a view showing the arrangement of the optical detector according to a first embodiment of the present invention.

The optical disk 110 can be the above described read-only disk, a once-writable disk, and a freely writable disk. A reflected light from the optical disk 110 is reflected by the beam splitter 104, and is detected by an optical detector 107 through a condenser lens 106. The optical detector 107 comprises four quarters of optical detectors A, B, C, and D as shown in FIG. 2. The signal (for convenience, an output from each of the optical detectors is referred to A, B, C, or D) detected by each of the optical detectors A through D is input to an operations unit 108 for performing a necessary operation to output a reproducing signal or a track servo signal.

Figure 3:
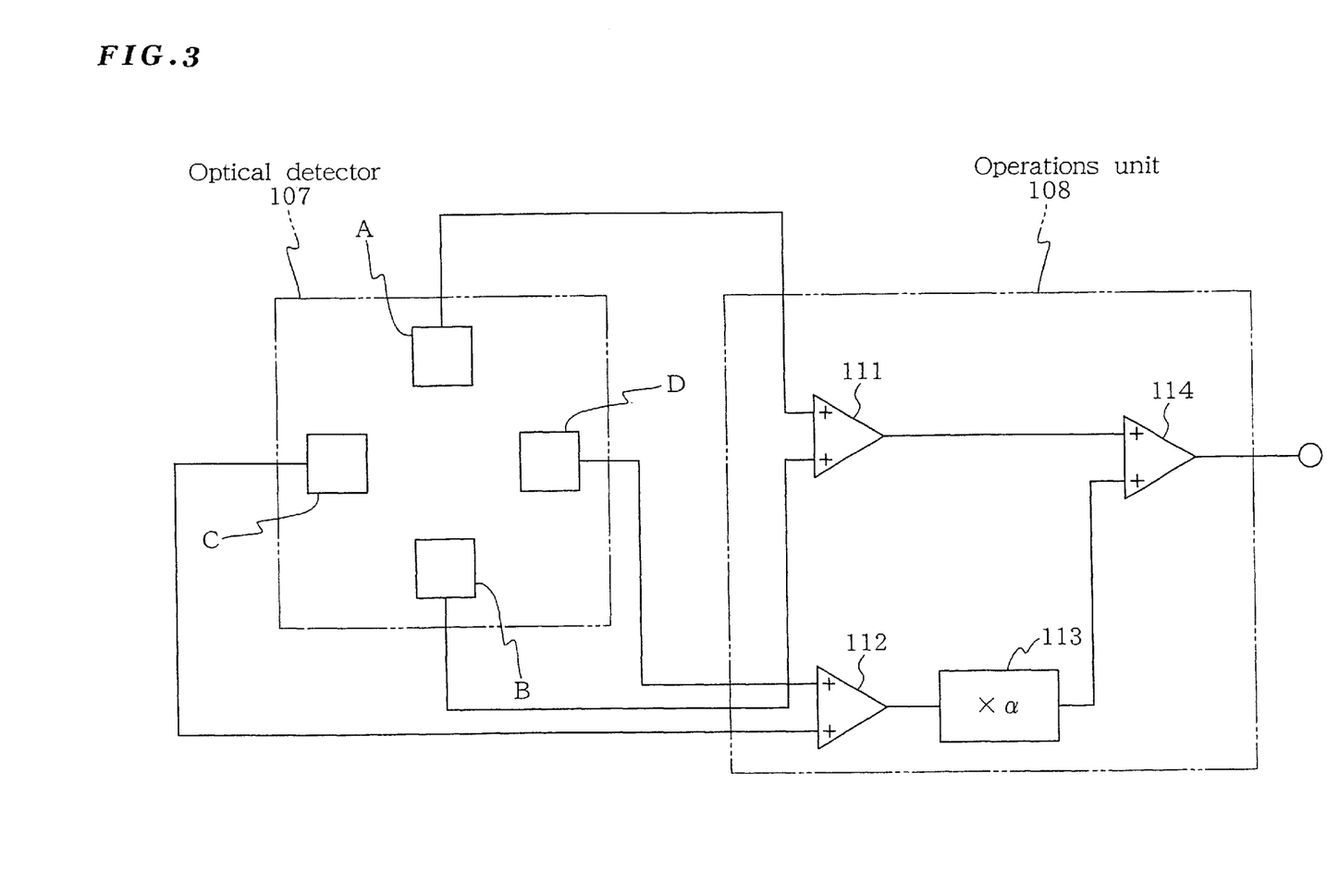
FIG. 3 is a view showing the configuration of the circuit of the optical detector and the operations unit.

FIG. 2 shows the arrangement of each of the optical detectors A through D of the optical detector 107. The optical detectors A and B are arranged opposite each other in the proceeding direction of an optical spot, and the optical detectors C and D are arranged opposite each other in the direction vertical to the proceeding direction of the optical spot. The operations unit 108 comprises an adder 111 for adding up the outputs from the optical detectors A and B and outputting A+B as shown in FIG. 3. The present embodiment further comprises an adder 112 for adding the outputs from the optical detectors C and D and output C+D, a multiplier 113 for multiplying the output from the adder 112 by α (α is a coefficient larger than 0 and smaller than 1), and an adder 114 for adding the output from the multiplier 113 to the output from the adder 111.

Basically, with the above described configuration, a diffracted light in the proceeding direction of an optical spot is emitted to the optical detectors A and B. On the other hand, a diffracted light in the direction vertical to the proceeding direction of the optical spot is emitted to the optical detectors C and D. The intensity of the diffracted light in the proceeding direction of an optical spot depends on the length of a mark or a pit. On the other hand, the intensity of a diffracted light in the direction vertical to the proceeding direction of the optical spot depends on the width of a mark or a pit.

At this time, if a diffracted light in the proceeding direction of the optical spot and a diffracted light in the direction vertical to the proceeding direction of the optical spot are simultaneously detected, the characteristics of both lights are mixed. Therefore, there arises the problem that the center position (center level) of the signal amplitude may be shifted depending on the length of the mark or pit in the proceeding direction of the optical spot. In the present embodiment, a sum signal of only the optical detectors A and B is used as a reproducing signal. Otherwise, a sum signal ((A+B)+α(C+D)) obtained by adding up a signal (A+B) of the optical detectors A and B and a value a (C+D) obtained by multiplying a sum signal (C+D) of the optical detectors C and D by a coefficient α is used as a reproducing signal.

Thus, a diffracted light in the proceeding direction of the optical spot can be mainly detected. Since the diffracted light contains the characteristic relating to the edge of a mark or a pit on an optical disk in case of the sum signal, there arises no problems that the center position of the signal amplitude may be shifted depending on the length of a mark or a pit in the proceeding direction of the optical spot. As a result, a high margin specific to a sum signal can be obtained.

Figure 4:
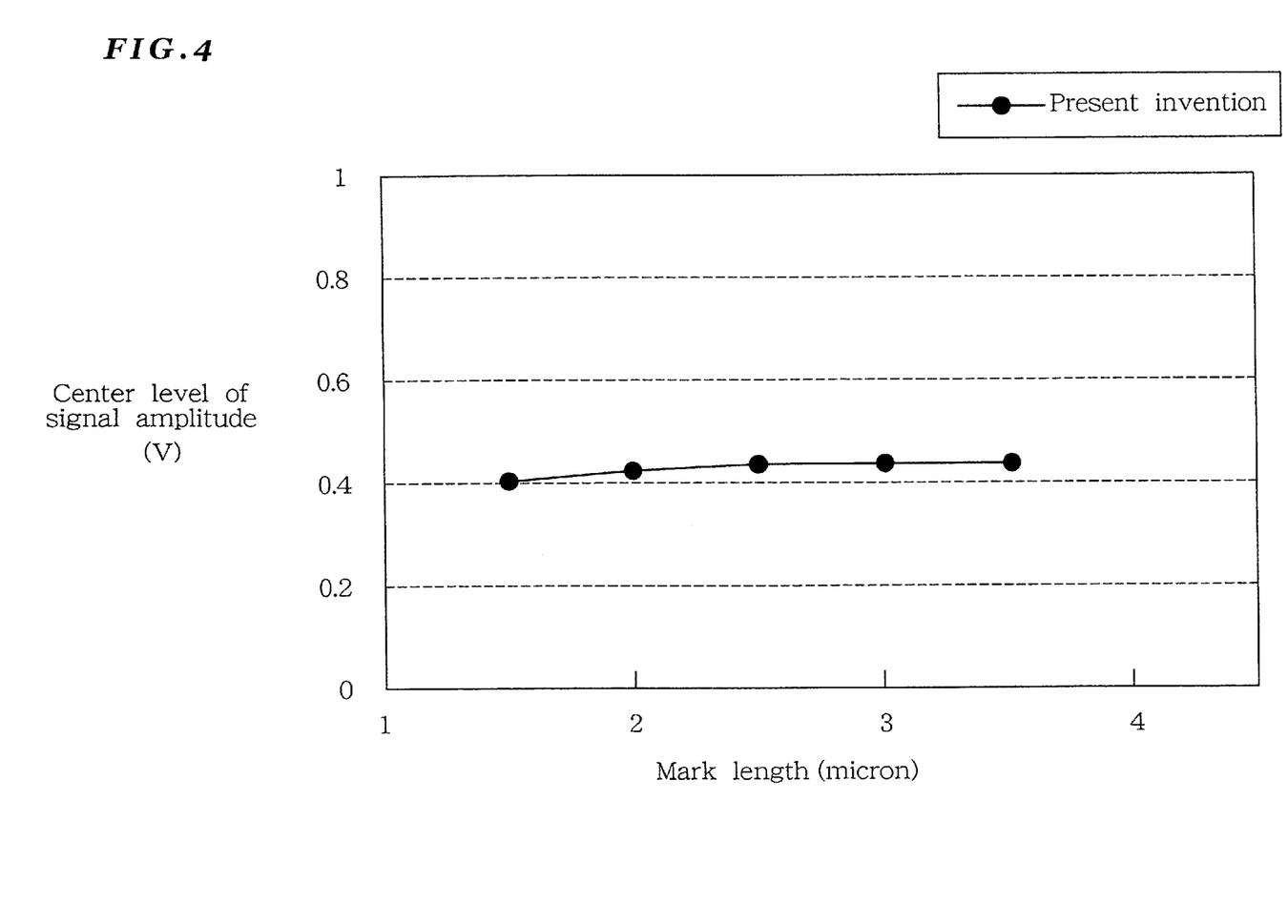
FIG. 4 is a view showing the relationship between the center value of the signal amplitude and the length of a mark or a pit according to the reading method of the present invention.

FIG. 4 shows the relationship between the center position of signal amplitude and the length of a mark or a pit according to present invention relating to this embodiment. In FIG. 4, the center position of signal amplitude has nothing to do with the length of a mark or a pit. According to the present embodiment, the sum signal (C+D) of the lights received by the optical detectors C and D is multiplied by a predetermined coefficient α, and the result is added to a sum signal (A+B) of the outputs from the optical detectors A and B. These operations are performed because the larger the amount of total light is, the better result can be obtained when, for example, an amplified noise is high.

Figure 5:
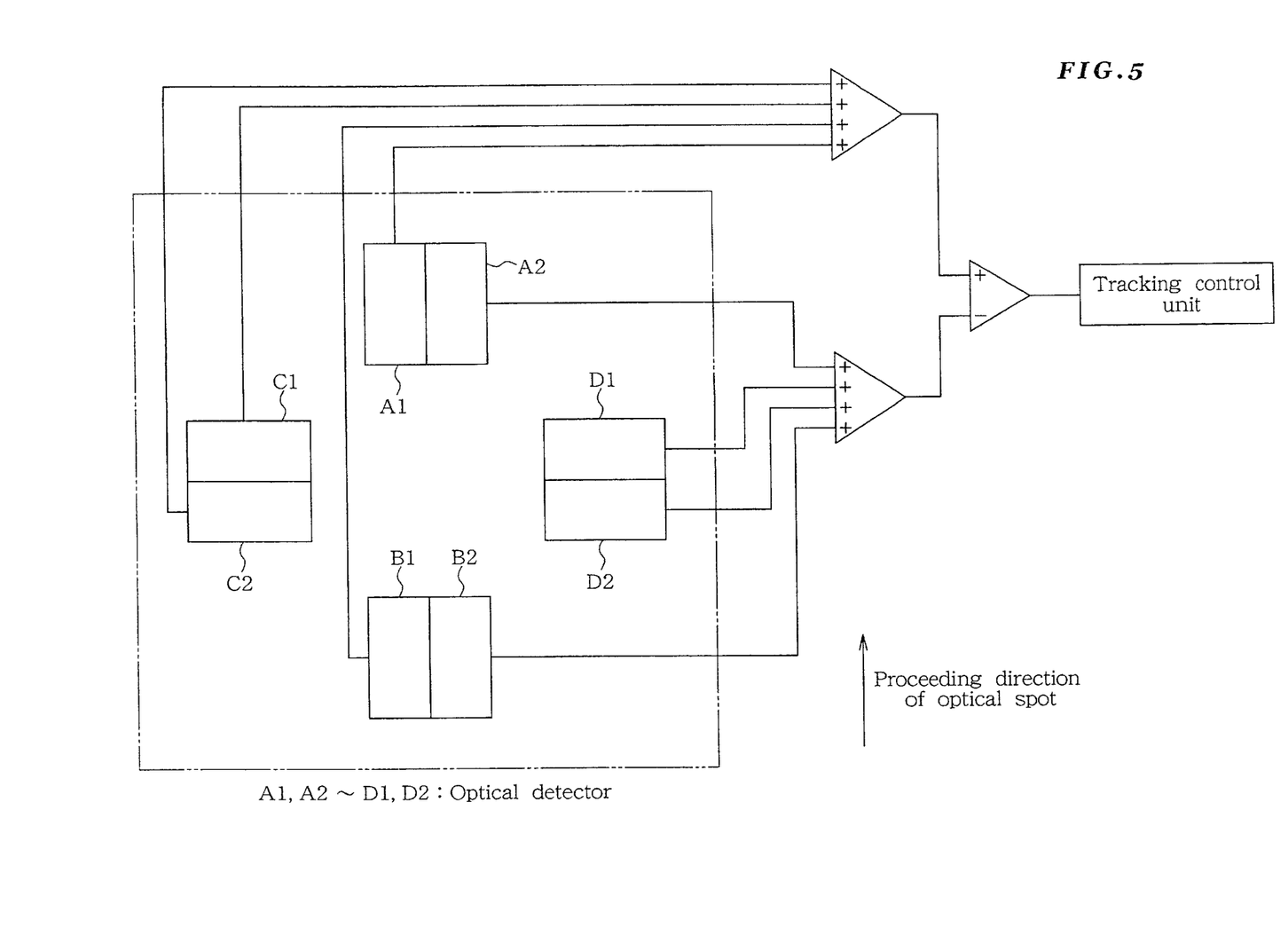
FIG. 5 is a view showing the arrangement of the optical detector according to a second embodiment of the present invention.

FIG. 5 shows the configuration of the optical detector according to the second embodiment of the present invention. In this example, the four optical detectors A through D shown in FIG. 2 are halved by the line in the proceeding direction of the optical spot and the line in the direction vertical to the proceeding direction of the optical spot, thereby forming eight optical detectors A1, A2, ..., D1, and D2. The operations unit can use the A1+A2+B1+B2 as a reproducing read signal, or can use the sum added to a value obtained by multiplying (C1+C2+D1+D2) by a coefficient α as a reproducing signal. By using the reproducing signal, as in the above described first embodiment, only the diffracted light in the proceeding direction of the optical spot can be detected, and the problem that the center position of signal amplitude may be shifted depending on the length of a mark or a pit in the proceeding direction of the optical spot can be suppressed. Therefore, a high margin specific to a sum signal can be obtained.

According to the second embodiment, the optical detector is divided into 8 sections in consideration of the tracking control. Thus, by dividing the optical detector into eight sections, a conventionally suggested device, especially a circuit, can be used as a tracking control system. That is, (A1+C1+C2+B1)−(A2+D1+D2+B2) or (A2+D1+D2 +B2)−(A1+C1+C2+B1) is used as a track servo signal when information using CD-R, DVD-R, MO, PD, and DVD-RAM is reproduced. That is, a track servo signal is input to a tracking control unit. Then, in tracking control, a conventional optical detector as shown in FIG. 9 can be detected. When information is reproduced by using DVD-Video and DVD-ROM, a detecting process can be performed by a reproducing apparatus using a conventional optical detector as shown in FIG. 9 by using (A1+C1+B2+D2)−(A2+D1

+B1+C2) or (A2+D1+B1+C2)−(A1+C1+B2+D2) as a track servo signal as regarding tracking control.

Figure 6:
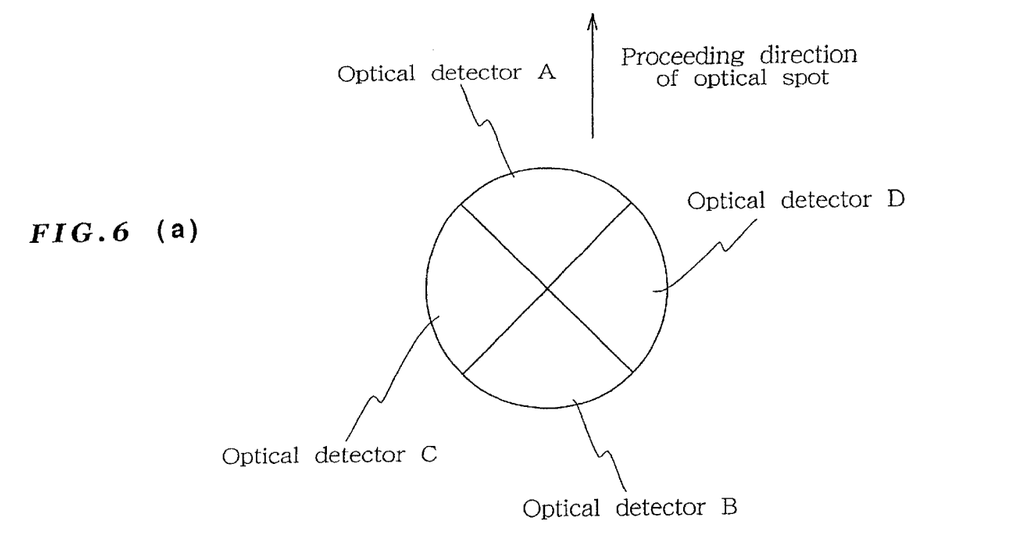

According to the above described embodiments, each of the optical detectors is described as an independent unit for comprehensibility. However, an optical detector will be designed as follows. For example, according to the first embodiment, one circular area is divided into four optical detector segments A through D as shown in FIG. 6(a). According to the second embodiment, the divided four optical detector segments A through D can be halved in the proceeding direction of the optical spot or in the direction vertical to the proceeding direction of the optical spot as shown in FIG. 6(b). It is obvious that the optical detector is not limited to circular or square, but can be of any form such as a rectangle, a diamond, a triangle, etc. which satisfies the gist of the present invention.

EXAMPLE

Figure 7:
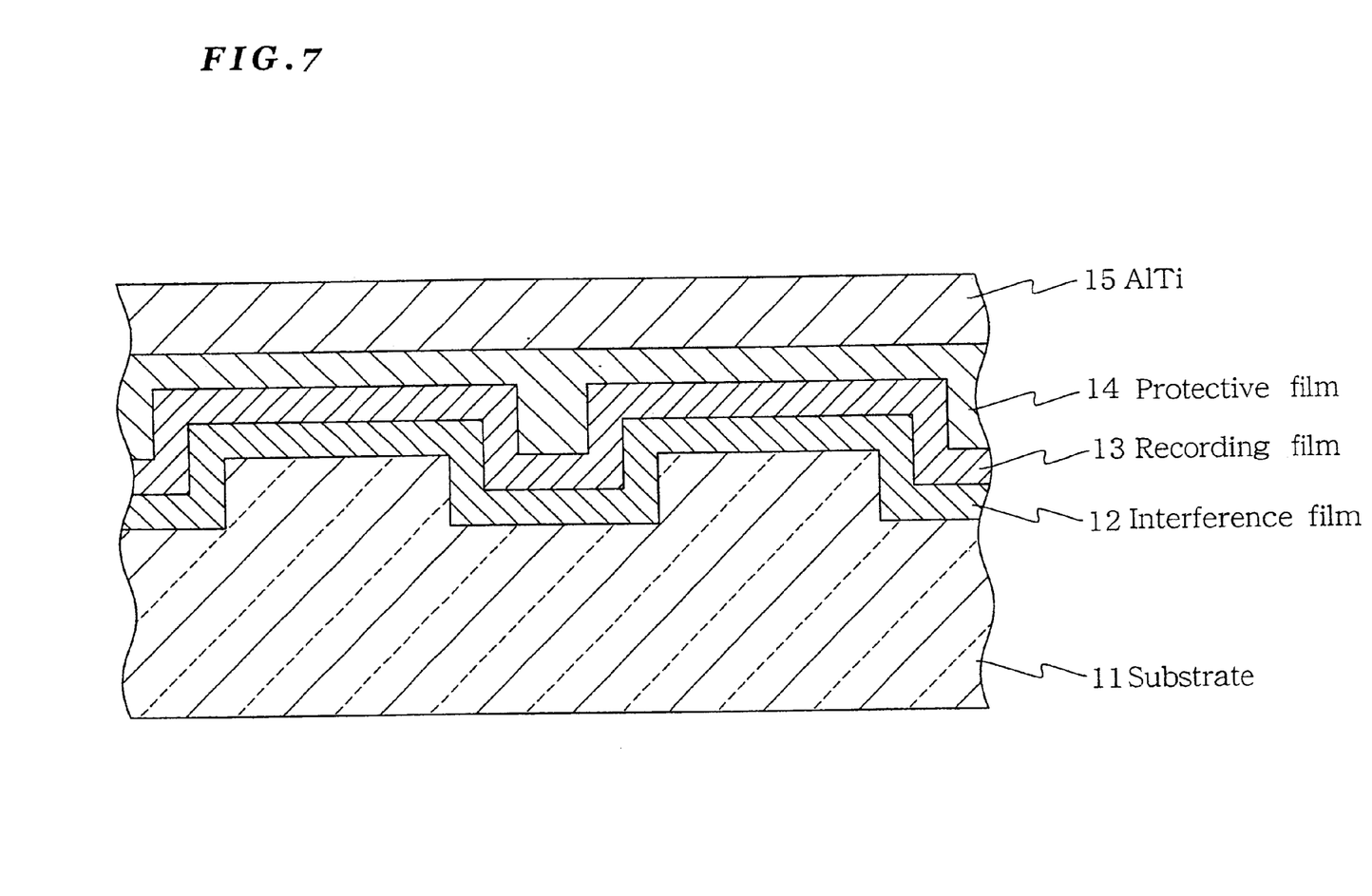
FIG. 7 is a sectional view of an optical disk used in an embodiment of the present invention.

Described below will be the embodiments according to the present invention. As an embodiment of the present invention, information recorded on an ID division of a phase change storage medium can be recorded. As a phase change storage medium, a unit shown in FIG. 7 is adopted. An interference film 12 and a recording film 13 are formed on the surface of a substrate 11 on which a land and a groove are formed. A protective film 14 is formed on the surface of the recording film 13. With the configuration shown in FIG. 7, only two dielectric films (the interference film 12 and a protective film 1) and the recording film 13 are shown on the substrate 11. However, a reflecting film, etc. can be formed on a dielectric film (the farthermost dielectric film from the substrate) on the recording film 13. As a material of the substrate 11, synthetic resin, glass, etc. such as polycarbonate, acrylic resin, etc. can be used. These materials can be coated with resin, etc. As for the shape of the substrate 11, it can be a disk, a card, etc. For the recording film 13, a chalcogenide-type phase change material such as GeSbTe, InSbTe, InSe, InTe, AsTeGe, TeOx-GeSn, TeSeSn, SbSeBi, BiSeGe, AgInSbTe can be used. As a reflecting film, Al, AlTi, etc. are desired.

According to the embodiment, the substrate 11 is a polycarbonate substrate having a diameter of 120 mm, a track pitch of 0.58 $\mu$m, and a thickness of 0.6 mm. Sequentially on the substrate 11, a ZnS—SiO$_2$ film having a thickness of 170 nm is provided as the interference film 12, a Ge$_2$Sb$_2$Te$_5$ film having a thickness of 14 nm is provided as the recording film 13, and a ZnS—SiO$_2$ film having a thickness of 20 nm is provided as the protective film 14. In addition, an AlTi film 15 having a thickness of 100 nm is provided on the protective film 14. A pit is formed as an ID division on the disk substrate. The ID division is designed at the boundary between a land and a groove provided on the disk. The information on the ID division is read in the state as shown in FIG. 10(a).

Figure 8:
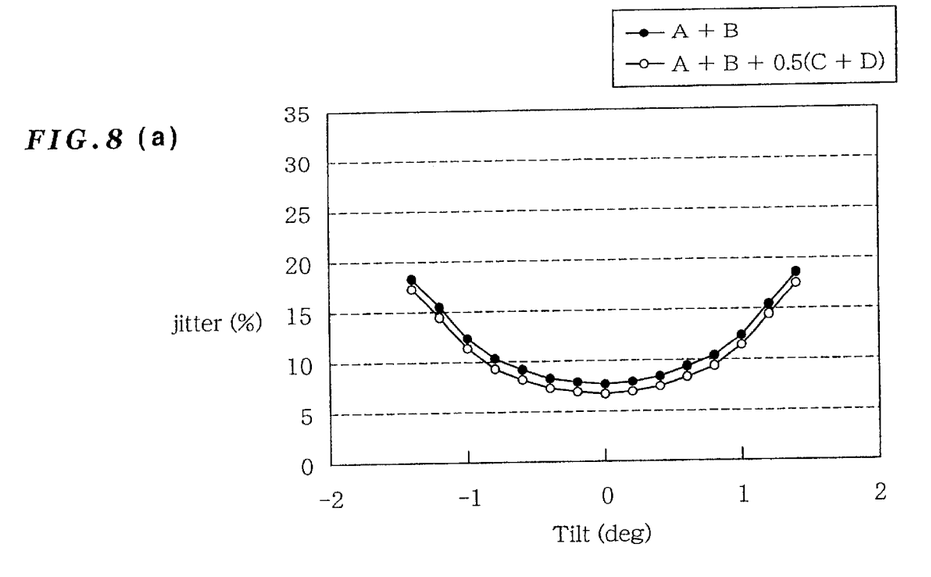
FIGS. 8(a) and 8(b) are views showing jitter margins according to the conventional reproducing method and the reproducing method according to the present invention.

With the above described configuration of the disk, an optical detector shown in FIG. 6(a) is adopted. FIG. 8(a) shows the jitter margins obtained when information is reproduced by using the output A+B of the optical detector and by using A+B+0.5 (C+D). When both margins are almost equal to each other and the jitters equal to or lower than 15% realize desirable reading areas, a tilt margin of ±1.2° exists. A similar experiment has been carried out for the substrate with which an ID division is provided on a land or a groove. In this case, information on the ID division can be read in the state shown in FIG. 10(b) with a result similar to that obtained above.

Similarly, when information is reproduced by (A1+A2+B1+B2) or (A1+A2+B1+B2)+0.4(C1+C2+D1+D2) by using the optical detector shown in FIG. 6(b), a similar result can be obtained. Since the optimum value of a coefficient represented as a depends on the arrangement of the optical detector, it is tuned as necessary. When an optical detector is used, (A1+C1+C2+B1)−(A2+D1+D2+B2) or (A2+D1+D2+B2)−(A1+C1+C2+B1) is used as a track servo signal. As a result, a track servo signal obtained in a normal reading process can be obtained. That is, it is not necessary to change the circuit tuning of the track servo system.

As the above described embodiment is similarly applied to the data division of CD, the pit division of CD-R, the pit division of DVD-R, the pit division of DVD-RAM, and the pit division of MO. Better jitter characteristics can be obtained in all of these divisions than in the conventional reproducing method. In addition, a better jitter characteristic can also be obtained than in the conventional reproducing method by applying the optical detector shown in FIGS. 6(a) and 6(b) to data divisions of DVD-ROM and DVD-Video. In this case, (A1+C1+B2+D2)−(A2+D1+B1+C2) or (A2+D1+B1+C2)−(A1+C1+B2+D2) is used as a track servo signal. In this method, the track servo signal obtained in the normal reproducing process can be obtained. That is, it is not necessary to change the circuit tuning of the track servo system.

FIG. 8(b) shows the result of detecting the ID division of a phase transform storage medium by a sum signal and a different signal by using the conventionally designed optical detector shown in FIG. 9 instead of the optical detector in the above described embodiment. In this case, the ID division is provided at the boundary between a land and a groove, and the information on the ID division is read in the state shown in FIG. 10(a). The jitter margin for a sum signal is approximately ±1.0°, and the jitter margin for a difference signal is in the range from −0.6° to +1.0°. Thus, the present invention excels in jitter margin. In case of a difference signal, the minimum point of the jitter is smaller than that of a sum signal. However, the margin is unstable between positive and negative values, and the range is small. On the other hand, in case of a sum signal, the minimum point of the jitter is larger than that of the difference signal, but has a larger margin than a difference signal. When these cases are compared with the present invention, the minimum point of a jitter is almost the same as that of the difference signal, thereby indicating a higher margin than the margin of the sum signal. As a result, the present invention has only the merits of the sum signal and the difference signal. Similarly, information recorded on the data division of CD, the pit division of CD-R, the pit division of DVD-R, the pit division of DVD-RAM, the pit division of MO, the data division of DVD-ROM, and the data division of DVD-Video are reproduced by a sum signal or a difference signal. In all these cases, the jitter margin is inferior to the present invention.

In the above described embodiments, a reflected light from an optical disk is detected to read information. However, the present invention can also be applied to a transmission-type optical disk.

As described above, according to the present invention, information recorded on an optical disk is reproduced by signals obtained by adding up optical outputs from two optical detectors positioned opposite each other in the proceeding direction of the optical spot, relative to the optical disk, emitted to the optical disk. Otherwise, the optical outputs of other two optical detectors, arranged opposite each other in the direction vertical to the proceeding direction of the optical spot, are added up. The sum is added to an output obtained by multiplying the value by a coefficient larger than 0 and smaller than 1. The resultant signal is furthermore added up to read information. Therefore, information can be reproduced in the state in which the former two optical detectors receive a diffracted light in the proceeding direction of the optical spot, and the latter two optical detectors receive a diffracted light in the direction vertical to the proceeding direction of the optical spot. Thus, the diffracted light in the proceeding direction of the optical spot can be mainly detected. In case of a sum signal, the diffracted light contains the characteristic relating to the edge of a mark or a pit. Therefore, there arises no problem that the center position of signal amplitude may be shifted depending on the length of a mark or a pit in the proceeding direction of the optical spot. As a result, a high margin specific to a sum signal can be obtained, thereby realizing a reproducing process with high precision from a high-density optical disk.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-305377 (Filed on Oct. 27$^{th}$, 1998) including specification, claims, drawings and summary are incorporated herein by reference in its entirety.

What is claimed is:

1. The method of reproducing information recorded on an optical disk based on an optical output detected as a light transmitted or reflected by the optical disk after emitting an optical spot to the optical disk, comprising the steps of:
    reproducing said information by a sum signal obtained by adding up optical outputs from a first set of two optical detectors positioned opposite each other in a proceeding direction of the optical spot on said optical disk;
    adding optical outputs from a second set of two optical detectors positioned opposite each other in a direction vertical to the proceeding direction of said optical spot;
    multiplying a sum of the optical outputs by a predetermined coefficient larger than 0 and smaller than 1; and
    reproducing the information by adding an output of the multiplication to a sum signal obtained by the first set of the two optical detectors.

2. The method of reproducing information recorded on an optical disk according to claim 1, wherein
    each of the two optical detectors in the first set is divided into two sections in the direction parallel to the proceeding direction of the optical spot, each of the two optical detectors in the second set is divided into two sections in the proceeding vertical direction of the optical spot, said information is reproduced by tracking-controlling the optical spot on said optical disk by using each optical output from each of the divided optical disks.

3. The apparatus of reproducing information recorded on an optical disk comprising:
    a light source unit emitting an optical spot to the optical disk;
    an optical detector detecting a light transmitted or reflected by said optical disk; and
    an operation unit obtaining an information reproducing signal by computing an output from the optical detector, wherein:
        said optical detector comprises: a first optical detector and a second optical detector positioned opposite each other in a proceeding direction of the optical spot on said optical disk; and a third optical detector and a fourth optical detector positioned opposite each other in the direction vertical to the proceeding direction of the optical spot; and
        said operation unit comprises: a first adder obtaining a first sum signal obtained by adding up optical outputs from said first optical detector and the second optical detector; a second adder obtaining a second sum signal obtained by adding up optical outputs from said third optical detector and said fourth optical detector; and a third adder adding a value obtained by multiplying the second sum by a coefficient larger than 0 and smaller than 1 to the first sum signal.

4. The apparatus of reproducing information recorded on an optical disk according to claim 3, wherein:
    said first optical detector and said second optical detector are divided into two sections in the direction parallel to the proceeding direction of the optical spot; and
    said third optical detector and said fourth optical detector are divided into two sections in the direction vertical to the proceeding direction of the optical spot.

5. The apparatus of reproducing information recorded on an optical disk according to claim 4, further comprising:
    a tracking control unit track-controlling said optical spot on said optical disk by using (A1+C1+C2+B1)−(A2+D1+D2+B2) or (A2+D1+D2+B2)−(A1+C1+C2+B1) as a track servo signal when:
    each of the optical outputs from said divided first optical detector is A1 and A2;
    each of the optical outputs from said divided second optical detector is B1 and B2;
    each of the optical outputs from said divided third optical detector is C1 and C2; and
    each of said optical outputs from said divided fourth optical detector is D1 and D2.

6. The apparatus of reproducing information recorded on an optical disk according to claim 4, further comprising:
    a tracking control unit track-controlling said optical spot on said optical disk by using (A1+C1+B2+D2)−(A2+D1+B1+C2) or (A2+D1+B1+C2)−(A1+C1+B2+D1) as a track servo signal when:
    each of the optical outputs from said divided first optical detector is A1 and A2;
    each of the optical outputs from said divided second optical detector is B1 and B2;
    each of the optical outputs from said divided third optical detector is C1 and C2; and
    each of the optical outputs from said divided fourth optical detector is D1 and D2.

7. The apparatus of reproducing information recorded on an optical disk according to claim 3, wherein
    said first optical detector, said second optical detector, said third optical detector, and said fourth optical detector are formed by dividing one optical detector.

8. The apparatus of reproducing information recorded on an optical disk according to claim 4, wherein
    said first optical detector, said second optical detector, said third optical detector, and said fourth optical detector are formed by dividing one optical detector.

9. The apparatus of reproducing information recorded on an optical disk according to claim 5, wherein said first optical detector, said second optical detector, said third optical detector, and said fourth optical detector are formed by dividing one optical detector.

10. The apparatus of reproducing information recorded on an optical disk according to claim 6, wherein said first optical detector, said second optical detector, said third optical detector, and said fourth optical detector are formed by dividing one optical detector.

* * * * *